United States Patent

Voigt et al.

[11] 3,986,460
[45] Oct. 19, 1976

[54] ANCHORING DEVICE FOR SECURING OF FREIGHT CONTAINERS

[75] Inventors: Werner Voigt, Weilheim; Guenter Blas, Faistenhaar, both of Germany

[73] Assignee: Messerschmitt-Bolkow-Blohm GmbH, Munich, Germany

[22] Filed: June 30, 1975

[21] Appl. No.: 591,863

[30] Foreign Application Priority Data
July 5, 1974 Germany............................ 2432245

[52] U.S. Cl. ........................ 105/366 C; 244/137 R
[51] Int. Cl.² ......................................... B61D 17/00
[58] Field of Search ........ 105/366 R, 366 B, 366 C; 244/137 R, 118 R

[56] References Cited
UNITED STATES PATENTS

| 3,698,679 | 10/1972 | Lang et al. .................. 105/366 C X |
| 3,810,534 | 5/1974 | Prete........................... 105/366 C X |

Primary Examiner—M. H. Wood, Jr.
Assistant Examiner—Gene A. Church
Attorney, Agent, or Firm—Woodhams, Blanchard and Flynn

[57] ABSTRACT

An anchoring device for securing freight containers to the freight deck of an aircraft. A plurality of locking hooks are pivotally secured to the flight deck beneath the surface thereof. A resilient device is provided to urge the locking hooks to an upright position wherein the hook portion of the locking hook projects above the surface of the freight deck. The locking hooks, when in the retracted position beneath the surface of the freight deck are locked in position by a pair of locking mechanisms. One of the locking mechanisms is connected to a roll-over bar and the other locking mechanism is a manually operated release lever. The roll-over bar will be moved in response to an engagement therewith by a freight container. As a result, when a freight container has engaged the roll-over bar, the first locking mechanism will be released and the locking hook will only be released from a holding by the second locking mechanism by an operation of a manually operated release mechanism.

9 Claims, 6 Drawing Figures ns="ANCHORING DEVICE FOR SECURING OF FREIGHT CONTAINERS

FIELD OF THE INVENTION

The invention relates to an anchoring device for securing freight containers, in particular in aircrafts, having a single or multiple locking mechanism which can be pivoted beneath the freight deck surface and a roll-over bar which constantly projects above the freight deck surface and over which containers can be moved from all sides.

BACKGROUND OF THE INVENTION

A similar anchoring device is described and illustrated in U.S. application Ser. No. 494,467, filed Aug. 5, 1974. In this device, the latches or locking hooks are lowered automatically when the freight containers are moved into contact with the roll-over bar. After the freight containers have moved over the latches or locking hooks, they automatically stand up again. Such constructions have the characteristic that the anchoring device is often unnecessarily operated and, as a result, could cause a premature breakdown.

The basic purpose of the invention is to improve the known structure and to provide an anchoring device, which in the rest position has its latches or locking hooks always initially positioned below the freight room deck so that only the roll-over bar is operated by freight containers moving over same; only when the anchoring device is needed does the roll-over bar serve as a release mechanism for the latches or locking hooks. This purpose is attained by providing a locking mechanism for the above-described anchoring device having two locks, one of which is coupled to the roll-over bar and the other one to a separate release lever. This structure permits a holding of the locking mechanism with the second lock being always positioned below the freight deck surface. The locking mechanism can be released by the roll-over bar only after an operation of the release lever of the second lock. This has the advantage that the anchoring device is released in each case only when directly needed.

Details of the invention can be taken from the following description of the illustrations.

BRIEF DESCRIPTION OF THE DRAWINGS

The drawings illustrate one exemplary embodiment of the invention.

In the drawings.

DETAILED DESCRIPTION

Figure 6:
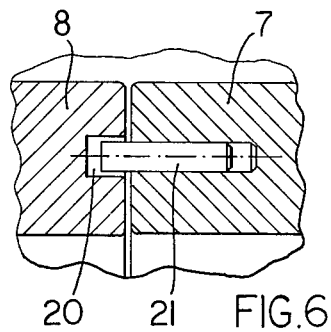
FIG. 6 is a sectional view taken along the line VI—VI of FIG. 5.

The inventive anchoring device consists of a housing-like frame 1, in the central area of which, for example, two latches or locking hooks 5 and 6 are pivotally supported about the axes 3 and 4. The latches or locking hooks 5 and 6 are in a reciprocal positive engagement — as is actually known — through corresponding recesses and guide pins 21 (FIG. 6) sliding therein, so that they lie in the folded or retracted condition below the freight room deck surface.

Figure 1:
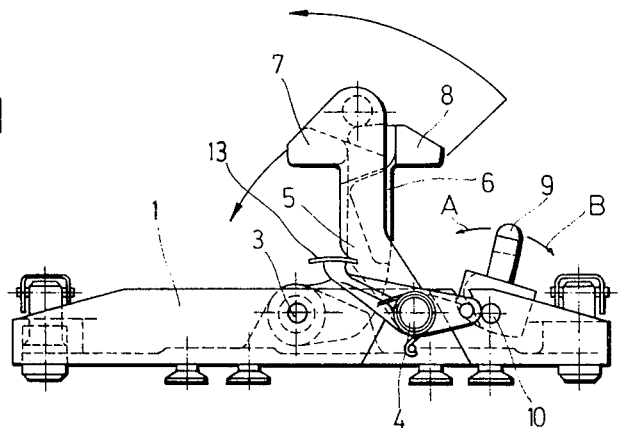
FIG. 1 is a side view.

As is shown in FIG. 1, the latches or locking hooks 5 and 6 each have nose-like projections 7 and 8 on their free ends, which projections engage in the swung-out or projecting condition — according to the illustration in FIG. 1 — corresponding recesses in the freight containers which are to be anchored and which are not shown.

The latches or locking hooks 5 and 6 are usually swung in against the spring force of a suitable spring so that the locking hooks can stand up again in the swung-out position according to FIG. 1 through the action of the stored energy in the spring.

To effect a release of the locking hooks 5 and 6 so that they will move to the upright swung-out position, a so-called roll-over bar 9 is used and which is pivotally supported for movement about the axis 10 in the frame 1. The roll-over bar 9 is constructed so that — as is also known — it will be pivoted about the axis 10 in either direction, corresponding with the arrow direction in FIG. 1, when the freight containers roll over it from any direction.

The roll-over bar 9 is connected to a lock 11 which holds the locking hooks 5 and 6 in the swung-in condition. Upon operation of the roll-over bar 9 in arrow direction B, the lock 11 releases the locking hooks 5 and 6. In order, however, for the latter to be able to swing out into a position according to FIG. 1, a further lock 12 must be released, which further lock 12 is connected to a lever 13. An operation of the lever 13 will effect a release of lock 12.

The essence of the invention lies in that the locking hooks 5 and 6 are locked twice in the swung-in condition; the release of the locking hooks for movement to the swung-out position taking place through an operation of the roll-over bar 9 only after the lock 12 is released by lever 13.

Figure 3:
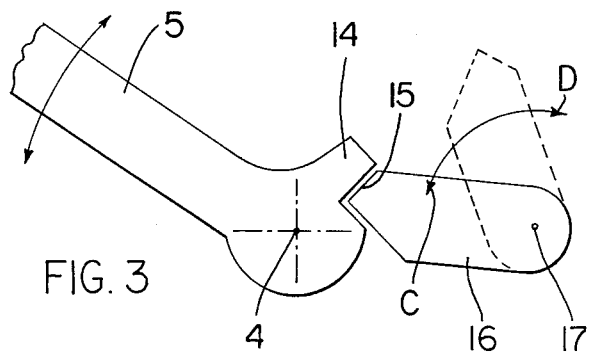
FIG. 3 illustrates a lock used within the frame of the invention.

FIG. 3 indicates principally how in a simple manner the locks 11 and 12 can be constructed. The locking hook 6 has in the area of its pivot axis 4 a nose 14, behind which engages the front side 15 of a lever 16 which is spring biased in the direction of the arrow C. The lever 16 has a pivot axis 17. In the illustrated condition, the latches or locking hooks 5 and 6 are forcedly held in the swung-in position.

Figure 2:
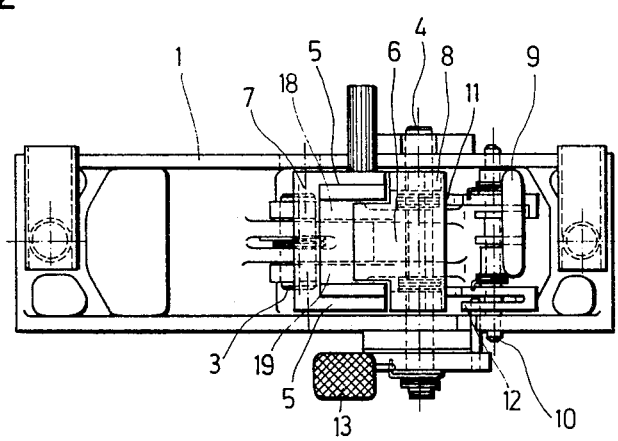
FIG. 2 is a top view of an anchoring device according to the invention.
Figure 4:
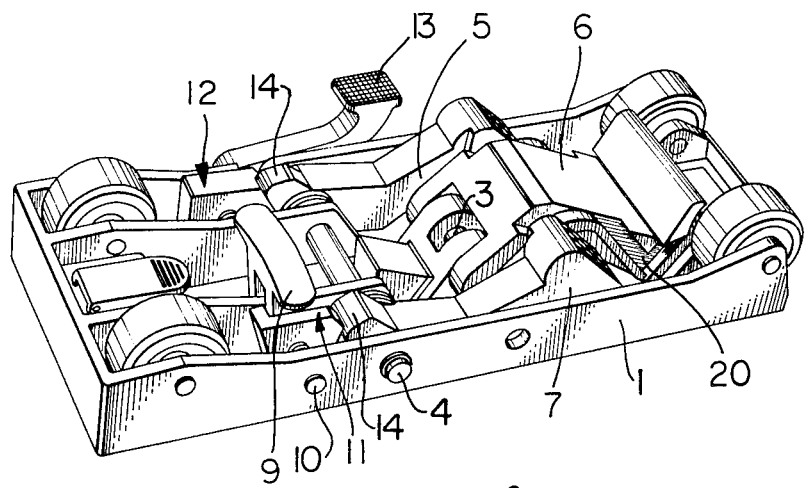
FIG. 4 is a perspective illustration of an anchoring device in the retracted condition.
Figure 5:
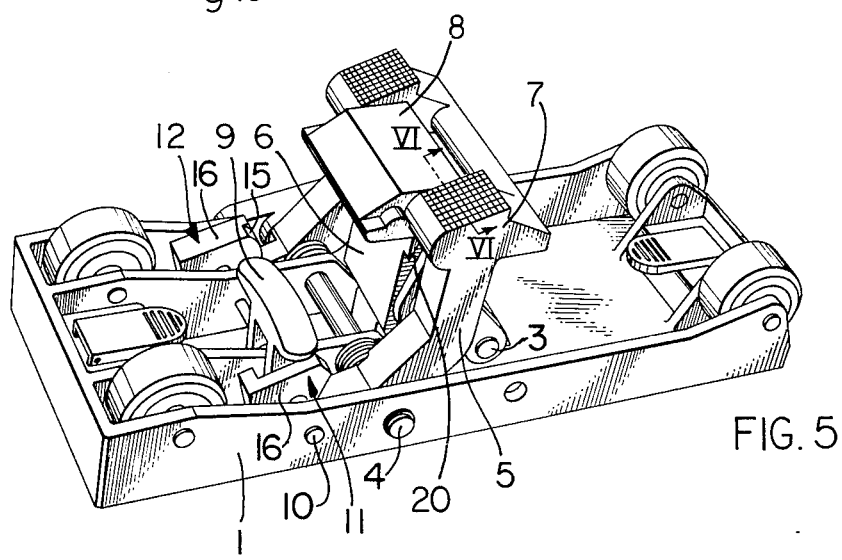
FIG. 5 is a perspective illustration of an anchoring device in the extended condition.

The latch 5 is, as can be recognized from FIGS. 2 and 4, constructed with two arms 18 and 19. Each arm 18,19 has a lock mechanism according to FIG. 3.

As soon as the lock 12 has been rotated in the direction of arrow D by the lever 13, compare dashed line in FIG. 3, the locking hooks 5 and 6 will be erected into the operating position in the same manner by releasing the lock 11.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An anchoring device for securing freight containers having at least one locking means pivotal between a position under the freight deck surface and a position above the freight deck surface and a roll-over bar which constantly projects from the freight deck surface and over which containers can be moved from all sides, comprising the improvement wherein said locking means includes two locks, one of which is coupled to said roll-over bar and the other one to a separate release lever, an unlocking of both locks effecting a deployment of said locking means.

2. An anchoring device according to claim 1, wherein the separate release lever is constructed as a foot operated lever.

3. An anchoring device according to claim 1, wherein said locking means includes two pivotal locking hooks, each having in the area of their pivot axes a nose behind which the front side of a lever, which is pivotally supported for movement about another pivot axis, engages under spring force and initially urged in a direction opposite to the movement of the locking hooks, as soon as the locking hooks are positioned below the freight room deck.

4. An anchoring device for securing freight holding devices to a floor, comprising:
  frame means;
  locking hook means pivotally secured to said frame means for movement between a first upright position projecting above the level of said floor and a second retracted position beneath the level of said floor;
  resilient means for continuously urging said locking hook means toward said first position;
  roll-over bar means pivotally secured to said frame means;
  first locking means for locking said locking hook means in said second retracted position and including first means responsive to a pivotal movement of said roll-over bar means for unlocking said first locking means;
  manually operable lever means pivotally secured to said frame means; and
  second locking means for locking said locking hook means in said second retracted position and including second means responsive to a manual operation of said manually operable lever means for unlocking said second locking means, said locking hook means being movable to said upright first position under the urging of said resilient means only in response to an unlocking of both of said first and second locking means.

5. An anchoring device according to claim 4, wherein said locking hook means comprise first and second locking hooks and third means for effecting a simultaneous movement thereof.

6. An anchoring device according to claim 5, wherein said first means of said first locking means includes a first locking member operatively connected to said first locking hook and a second locking member operatively connected to said roll-over bar means, said first locking member releasably engaging said second locking member to lock said first and second locking hooks in said retracted position; and
  wherein said second means of said first locking means includes a third locking member operatively connected to said first locking hook and a fourth locking member operatively connected to said manually operable lever means, said third locking member releasably engaging said fourth locking member to lock said first and second locking hooks in said retracted position.

7. An anchoring device according to claim 6, wherein said first locking hook has a pair of parallel legs straddling said second locking hook and pivotal about coaxial axes; and
  wherein said resilient means urges both legs of said first locking hook toward said upright first position.

8. An anchoring device according to claim 5, wherein said first and second locking hooks are each pivotally secured to said frame means about separate and parallel pivot axes.

9. An anchoring device according to claim 5, wherein said third means includes an elongated slot on one of said first and second locking hooks and a pin on the other of said first and second locking hooks received in said slot whereby a movement of one of said first and second locking hooks effects a simultaneous movement of the other of said first and second locking hooks.

* * * * *